United States Patent [19]
Schneider

[11] 3,771,150
[45] Nov. 6, 1973

[54] THREE DIMENSIONAL OPTICAL INFORMATION STORAGE SYSTEM

[76] Inventor: Irwin Schneider, 2402 Daphne Ln., Alexandria, Va.

[22] Filed: Apr. 30, 1971

[21] Appl. No.: 139,101

[52] U.S. Cl... 340/173 CC, 350/160 P, 340/173 LS
[51] Int. Cl......................... G11c 11/42, G11c 13/04
[58] Field of Search................ 340/173 CC, 173 LS; 350/160 P, 150

[56] References Cited
UNITED STATES PATENTS

| | | | |
|---|---|---|---|
| 3,466,616 | 9/1969 | Bron et al. | 340/173 CC |
| 3,609,707 | 9/1971 | Lewis et al. | 340/173 CC |

*Primary Examiner*—Stanley M. Urynowicz, Jr.
*Attorney*—R. S. Sciascia, Arthur L. Branning and Kenneth J. Hovet

[57] ABSTRACT

A system for storing information in or retrieving information from a three dimensional memory element is described. The storage principle is based upon aligning anisotropic color centers in alkali halide crystals and thereby producing dichroic absorptions which are equated to the stored information. The ability to write in the interior of the crystal is based on the fact that one can suppress the reorientation of these color centers with infrared excitation. Information states are thus established at interior regions by simply shielding those portions from the infrared excitation. Information is retrieved from the interior of the memory element by exposing it to excitation principally for the purpose of producing a transient color center absorption lying in an otherwise transparent region of the spectrum. The interrogation excitation would lie in this same spectral region.

14 Claims, 5 Drawing Figures

INVENTOR
IRWIN SCHNEIDER
Ken J. Hovet AGENT
Arthur L. Branning ATTORNEY

INVENTOR
IRWIN SCHNEIDER
Ken J. Hovet AGENT
Arthur J. Lonning ATTORNEY

INVENTOR
IRWIN SCHNEIDER
Ken J. Hovet AGENT
Arthur L. Branning ATTORNEY

THREE DIMENSIONAL OPTICAL INFORMATION STORAGE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1 Field of the Invention

The present invention relates to a three dimensional optical memory system. More particularly, it relates to an optical information storage and retrieval system utilizing the anisotropic properties of color centers in an alkali halide crystal.

2 Description of the Prior Art

There have been several techniques and systems devised for the storage and retrieval of information based on the anisotropic properties of alkali halide crystals. Some of these have been described by the present inventor in U.S. Pat. Applications Ser. No. 708,299, filed Feb. 26, 1968 and now U.S. Pat. No. 3,580,688; Ser. No. 90,800, filed Nov. 18, 1970; Ser. No. 101,400, filed Dec. 24, 1970 now U.S. Pat. No. 3,673,578; and Ser. No. 129,709 filed Mar. 31, 1971 now U.S. Pat. No. 3,720,926. However, these elements and practically all others employing photochromic elements have been intended for use in thin, two dimensional form. Clearly, although the storage capacity of such elements is large compared to conventional systems a three dimensional optical memory element would represent a major advance as it would have far larger potential storage density (i.e., - at least ten thousand times as much).

Until now, there have been two major obstacles which inhibited the development of three dimensional optical memory systems. One is the difficulty in writing information at an interior portion of the memory element without affecting other regions containing stored information. The second is the difficulty in retrieving the stored information at an interior bit without interference from other portions of the memory element. Three dimensional systems have been devised, such as the imaging and diffraction apparatus described in U.S. Pat. No. 3,296,594 to Van Heerden. Such systems are, however, highly complicated, expensive and are largely impractical.

SUMMARY OF THE INVENTION

In accordance with the present invention, there is provided a novel three dimensional optical information storage and retrieval system which overcomes problems peculiar to three dimensional storage. The present system provides the capability of storing at least a billion bits per $cm^3$ by conservative estimate. The system comprises an alkali halide memory element, a first radiation means for suppressing color center reorientations in bits exposed thereto, a second radiation means for establishing color center information states within said memory element, and a third radiation means for detecting said information states. Such a system provides for the storage of information at interior bits without affecting other portions of the memory element and it allows one to retrieve the stored information nondestructively without adverse interference from other portions of the memory element.

OBJECTS OF THE INVENTION

It is, therefore, an object of the present invention to provide a novel three dimensional optical memory system capable of storing at least a billion bits per $cm^3$.

It is a further object of the present invention to provide a novel technique for storing and retrieving information from a three dimensional alkali halide memory elements.

It is a still further object of the present invention to provide a novel three dimensional optical information storage and retrieval system based upon equating information to differences in dichroic absorption of color centers within an alkali halide memory element.

Still other objects, features and attendant advantages of the present invention will become apparent to those skilled in the art from a reading of the following detailed description taken in conjunction with the accompanying drawings wherein:

BRIEF DESCRIPTION OF THE DRAWINGS

FIG. 2 is a schematic representation of a three dimensional optical memory system during write-in.

DESCRIPTION OF THE PREFERRED EMBODIMENT

By way of brief explanation, it should be first recognized that practice of the invention depends on the orientation of anisotropic color centers located within alkali halide crystals. Color centers may generally be described as point defects or imperfections within a crystal lattice. These defects may consist of atomic vacancies, interstitial atoms and/or impurity atoms which may contain trapped electrons or holes. Often these centers are anisotropic and under certain circumstances, they can be optically reoriented thereby introducing dichroism in their absorption bands.

Figure 1:
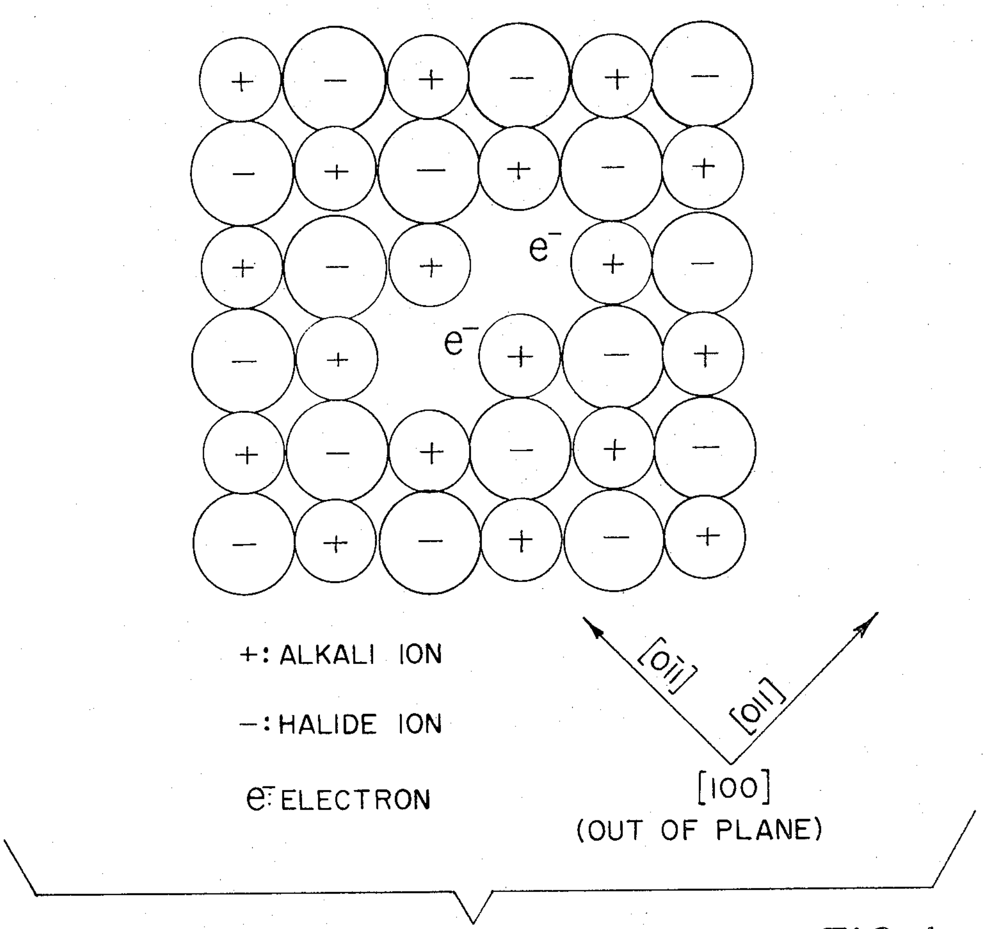
FIG. 1 shows a schematic model of the M center in an alkali halide crystal lattice.

One such anisotropic color center particularly useful for purposes of the present invention, is the M center in a KCl crystal. As shown in FIG. 1, the M center consists of two adjacent negative-ion vacancies, each with one trapped electron, oriented along a [110] crystallopgraphic direction. Its absorption bands lie principally in the visible and near infrared spectral regions, and each absorption has a transition moment oriented along one of three crystallographic directions. The most prominent of these is the M bank peaking near 800 nm and an absorption peaking near 685 nm -- the latter being a transient triplet absorption produced with light in the 300–600 nm region. Both bands have a transition moment along the [110] vacancy axis. Other transitions are the $M_F$ bands which peak at wavelengths between 400 and 600 nm. These have their dipole moments oriented along either the [110] or [100] directions perpendicular to the vacancy axis.

M centers are readily reoriented at temperatures below 200°K with radiation in the $M_F$ spectral region. By using polarized light, one can align practically all M centers along a single [110] direction. As a result, all absorptions depend strongly on the polarization of light, i.e., they become dichroic. The principle of equating the degree of dichroism to specific information has been utilized for two dimensional information storage with M centers in U.S. Pat. No. 3,466,616. Similar techniques using $M_A$ color centers are also disclosed in U.S. Pat. Application Ser. No. 708,299 filed Feb. 26, 1968, now U.S. Pat. No.

The novel technique for storing information within a three dimensional element is in part based on the fact that M (or $M_A$) center reorientation can be suppressed in any part of the memory element by exposing that part to red or near infrared radiation having a range of wavelengths from 600–1200 nm. The nature of this phenomenom is described in Phys. Rev. Letters 24, 1296 (1970) by the present inventor and is hereby incorporated by reference. U.S. Pat. Application Ser. No. 101,400, filed Dec. 24, 1970 by the present inventor is also hereby incorporated by reference in that it utilizes the above mentioned phenomena in novel two dimensional memory systems having memory elements containing M and $M_A$ centers. The use of the phenomena in the three dimensional optical memory systems has been described by the present inventor in Applied Optics, 10, 980 Apr. 1971) which is also hereby incorporated by reference.

In order for an alkali halide memory element containing M centers to operate in three dimensions, a means must first be provided for suppressing M center reorientations in bits exposed to reorientation excitation (reorientation excitation includes radiation used for writing, erasing and reading purposes). As described above, this can be accomplished by exposing the bits to red or near infrared radiation simultaneously with the writing excitation. The write (or erase) operation is accomplished by focussing reorientation radiation, which may be polarized or unpolarized, upon predetermined portions of the memory element such that it intersects the portion of the memory element that is being shielded from the red or near infrared suppression radiation. Only at this point of intersection will M center reorientation occur. The specific type of M center alignment, determined by the polarization of the incident reorientation radiation, thereby determines the specific information stored within the bit.

Interrogation comprises scanning the element with intersecting orthogonal second and third excitation radiation means for the purpose of retrieving previously stored information. The information state of the bits (i.e., the state of alignment of their M centers) is detected by measuring the dichroic absorption of the M centers contained within the bit in their triplet state rather than the commonly used singlet absorptions. By utilizing the triplet absorption, it is possible to gain access to an interior bit of the memory element for interrogation.

Figure 2:
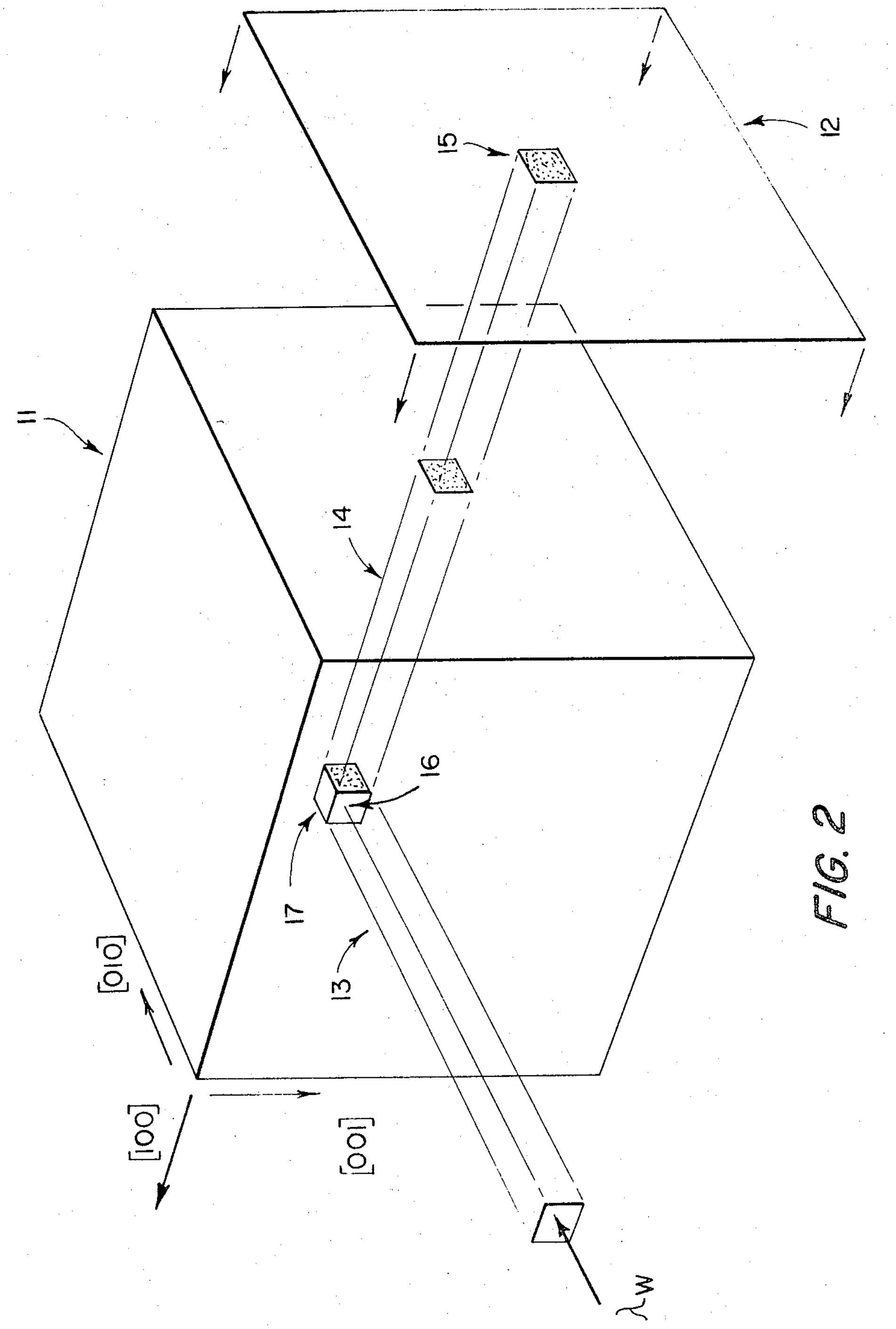

FIG. 2 schematically exemplifies one arrangement for writing (or erasing) information at an interior bit of a memory element. The memory element 11 is preferably a potassium chloride crystal containing $10^{18}$ M centers per $cm^3$ or less. Potassium iodide and potassium bromide are examples of other crystals that may be used. In any case, the memory elements should be maintained at temperatures below 200°K and most suitably at about 77°K for optimum operation and convenience. A writing source designated $\lambda_\omega$ comprises a focussed (or narrow collimated) excitation source such as a laser beam which is polarized and propagates along [010] at right angles to the face of memory element. Its wavelengths should generally be in the $M_F$ band ranging from 400 to 600 nm but might also lie further towards the ultraviolet region. The reorientation suppression radiation (RSR) propagates along [100] as a plane 12 of radiation exposing the entire memory element including most of that portion 13 irradiated by $\lambda_\omega$. It is only necessary to expose that region 13 of the memory element being irradiated with the writing source $\lambda_\omega$ to prevent reorientation of any previously aligned color centers. However, for convenience and since the effects of $\lambda_\omega$ radiation scattering would be minimized thereby, it may be preferable to expose the entire memory element.

By projecting the image 14 of a RSR shield 15 as shown at the focal point 16 of $\lambda_\omega$, one creates a shadow region in the memory element 11 at which point "writing" occurs. A bit 17 of information thereby becomes stored. The bit 17 dimensions are thus determined by the cross-sectional area 16 of $\lambda_\omega$ at its focus, and the length 18 of the shadow region measured along [010].

Figure 3:
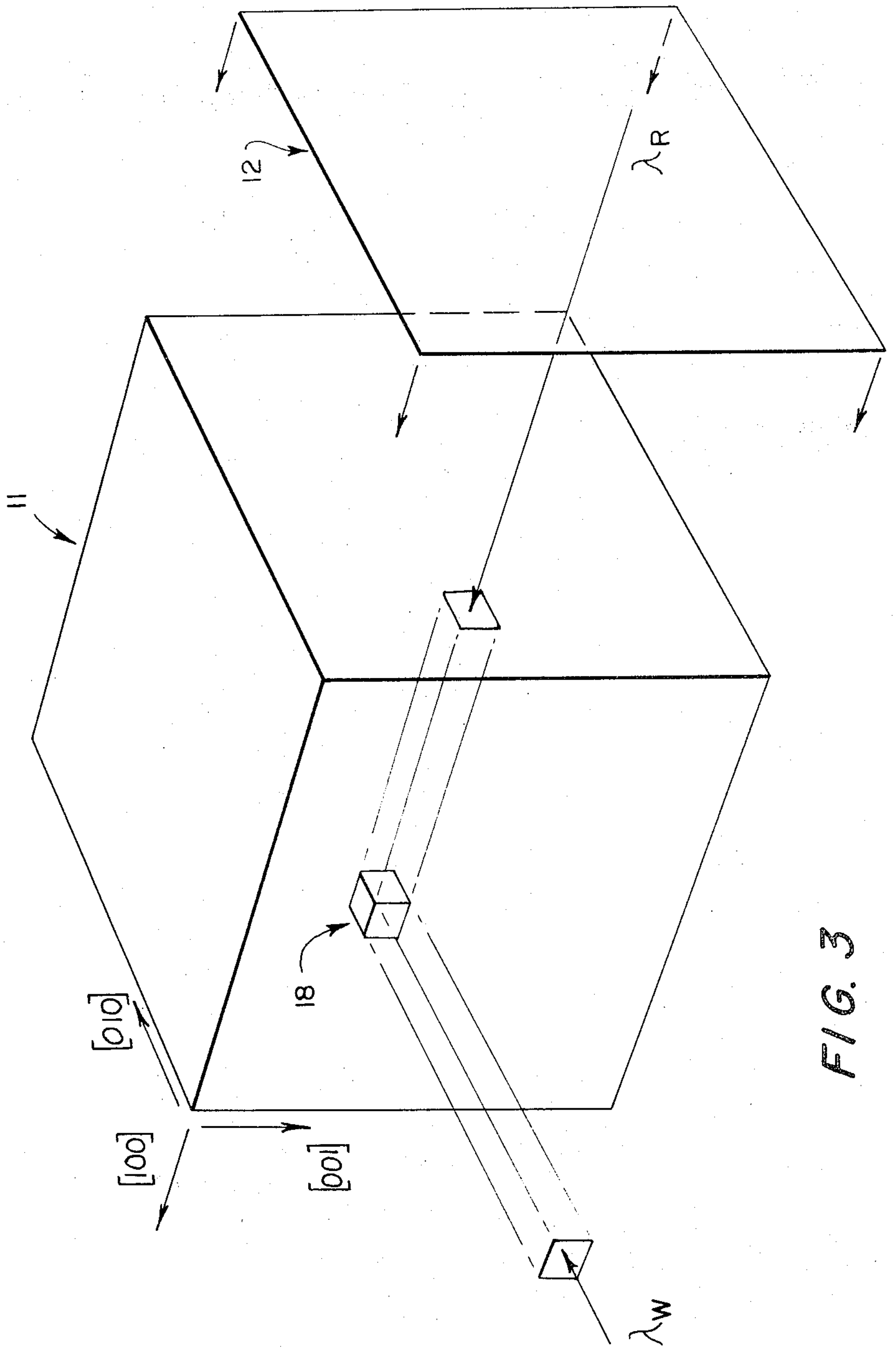
FIG. 3 is a schematic representation of a three dimensional optical memory system during readout.

Referring now to FIG. 3, interrogation of previously stored information is preceded by exposure both to λ 24, now to produce M center triplet absorptions, and to RSR light 12 without shielding, to suppress all reorientation in memory element 11. The suppression of all reorientation prevents destruction of previously stored information due to exposure of $\lambda_\omega$ light. The use of a reading source $\lambda_R$ absorbed only in the M center triplet band allows interrogation of only the bit of interest. This triplet absorption lies in the wavelength range from 650 to 720 nm with a peak at about 685 nm. $\lambda_R$ is polarized and directed along the [100] axis of the memory element and focussed so that it intersects λ 24 at a predetermined point 18, i.e., the point or bit which contains the stored information to be retrieved. Interrogation with $\lambda_R$ can occur either during or shortly after removing $\lambda_\omega$ or $\lambda_\omega$ and RSR. This choice arises from the fact that the triplet state is long-lived, e.g., 50 sec. at 77°K. Furthermore, since the $\lambda_R$ wavelength region overlaps that of the RSR source it might be possible, depending on the availability and characteristics of the radiation sources, to use one source for both purposes.

Figure 4A:
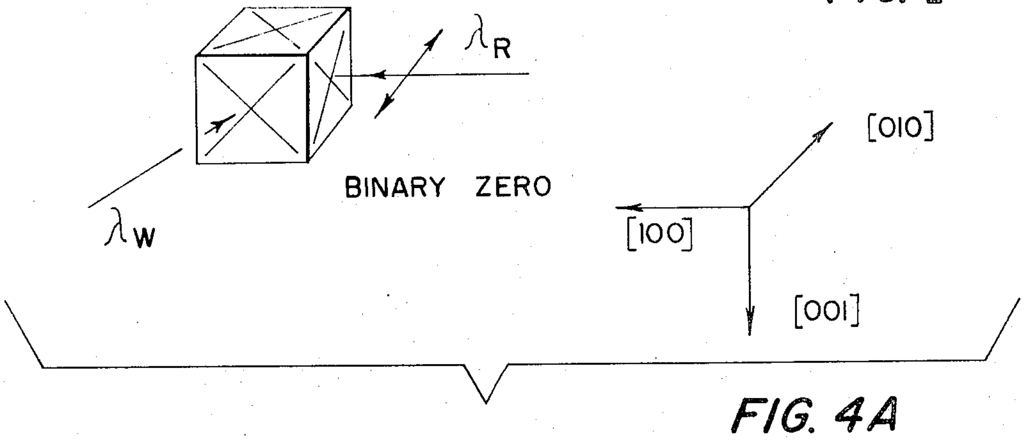
FIGS. 4A and 4B are a conceptual illustration or interior three dimensional optical memory bits representing the binary digits ZERO and ONE.
Figure 4B:
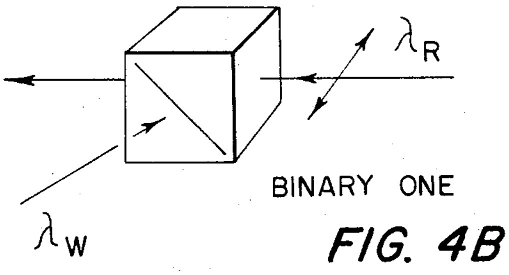

FIG. 4 illustrates two binary information states of an interior bit of a three dimensional element for which $\lambda_R$ is orthogonal to $\lambda_\omega$. The binary digit ZERO in FIG. 4A is arbitrarily chosen as a state in which M centers are distributed along all six [110] directions. This state may be produced, for example, if $\lambda_\omega$ were unpolarized. The binary digit ONE in FIG. 4B represents a state in which M centers are all aligned along the direction of a front face diogonal. In this case, the bit would be produced if $\lambda_\omega$ was linearly polarized along a [011] direction. The bits would be read and distinguishable if $\lambda_R$ were polarized along a [010] direction. Since the M centers in FIG. 4A are randomly aligned along six [110] crystallographic directions, transmittance of [010] polarized $\lambda_R$ radiation would be at least partially blocked. The decrease or total absence of transmitted radiation may thereby be detected and correlated to the binary ZERO. On the other hand, for the case of front face alignment illustrated in FIG. 4B, [010] polarized $\lambda_R$ radiation readily passes through the bit without absorption and may be detected and correlated to the binary ONE. As an alternative, detection may involve induced emission which would be present for the binary ZERO and absent for the binary ONE. For the case of the M center kcl, this emission would lie in the vicinity of 1080 nm.

The creation of information states by alternately orienting and reorienting M centers in cubical segments of the memory may be extended to extremely small cubical or bit dimensions with a resulting capacity of at least a billion bits per $cm^3$. Variations of the above tèchnique would include storing and retrieving information in analog form or storing information in display form. In the case of displays, λ would be an extended source such that it produces triplet states within an entire (100) plane of the memory element. The display would be evident when exposed to an orthogonal $\lambda_R$ radiation. Furthermore, the display may either be a conventional type or it may employ the techniques of holography. Additionally, other memory elements may be used having different anisotropic color centers provided that (1) the reorientation mechanism of the anisotropic centers involves the formation of an intermediary ionized form whose population is controllable with an auxiliary source (i.e., - RSR) and (2) a read wavelength in an otherwise transparent region of the spectrum is available.

Obviously many modifications and variations of the present invention are possible in light of the above teachings. It is therefore to be understood that within the scope of the appended claims the invention may be practiced otherwise than as specifically described. What is claimed and desired to be secured by letters patent of the united states is:

1. A three dimensional optical information storage and retrieval system comprising:

an alkali halide optical memory element containing anisotropic color centers capable of being oriented;

first excitation means including first radiation means operatively associated with said element for suppressing reorientations of said color centers by exposing said color centers to radiation having a range of wavelengths from 600–1200 nm;

means for shielding selected portions of said element from said first radiation means;

second excitation means including second radiation means operatively associated with said shielding means and said element to orient said color centers at predetermined points;

detection means including a polarized third radiation means operatively associated with said element to determine the information state thereof.

2. The system of claim 1, wherein said memory element comprises potassium chloride and said color centers are M centers.

3. The system of claim 1, wherein said means for shielding includes a microscopic-sized barrier for said first radiation means.

4. The system of claim 1, wherein said means for shielding includes a display image.

5. The system of claim 1, wherein said detection means includes means to determine the orientation of said color centers.

6. The system of claim 1 wherein said color centers are $M_A$ centers.

7. A method of storing and retrieving information with a three dimensional memory element containing anisotropic color centers comprising:

suppressing color center reorientations with first radiation means by exposing said color centers to radiation having a range of wavelengths from 600–1200 nm;

shielding selected portion of said element from said first radiation means;

exciting said color centers in predetermined regions of said shield portions with second radiation means; and, detecting the orientation of said excited color centers in said predetermined regions with third radiation means.

8. The method of claim 7, wherein said suppression, shielding, and exciting steps are carried out simultaneously.

9. The method of claim 7, wherein said third radiation means is polarized differently from said second radiation means.

10. The method of claim 7, wherein said memory element comprises potassium chloride and said color centers are M centers.

11. The method of claim 10, wherein said second radiation means produces triplet states in said M centers.

12. The method of claim 9, wherein said second radiation is unpolarized.

13. The method of claim 7, wherein said shielding occurs in a predetermined plane of said memory element.

14. The method of claim 7 wherein said color centers are $M_A$ centers.

* * * * *